(12) United States Patent
Turney et al.

(10) Patent No.: US 11,834,333 B2
(45) Date of Patent: Dec. 5, 2023

(54) NITROGEN PROCESS FOR PRODUCTION OF AMMONIA AND LIQUID HYDROGEN

(71) Applicant: L'Air Liquide, Société Anonyme pour l'Etude et l'Exploitation des Procédés Georges Claude, Paris (FR)

(72) Inventors: Michael A. Turney, Houston, TX (US); Alain Guillard, Houston, TX (US); Joseph T. Stroffolino, IV, Pearland, TX (US)

(73) Assignee: L'Air Liquide, Société Anonyme pour l'Etude et l'Exploitation Procédés Georges Claude, Paris (FR)

( * ) Notice: Subject to any disclaimer, the term of this patent is extended or adjusted under 35 U.S.C. 154(b) by 241 days.

(21) Appl. No.: 17/236,751

(22) Filed: Apr. 21, 2021

(65) Prior Publication Data
US 2021/0331917 A1    Oct. 28, 2021

Related U.S. Application Data

(60) Provisional application No. 63/013,763, filed on Apr. 22, 2020.

(51) Int. Cl.
*C01B 3/02*    (2006.01)
*C01C 1/04*    (2006.01)
*F25J 1/00*    (2006.01)

(52) U.S. Cl.
CPC ............ *C01B 3/025* (2013.01); *C01C 1/0423* (2013.01); *F25J 1/0015* (2013.01); *F25J 1/0035* (2013.01);
(Continued)

(58) Field of Classification Search
CPC ............ C01B 3/025; C01B 2203/0233; C01B 2203/068; C01B 2203/1623;
(Continued)

(56) References Cited

U.S. PATENT DOCUMENTS 5,736,116 A    4/1998    LeBlanc et al.
5,799,505 A    9/1998    Bonaquist et al.
(Continued)

FOREIGN PATENT DOCUMENTS

EP    0 262 894    4/1988

OTHER PUBLICATIONS

Baker, C.R. et al., A study of the efficiency of hydrogen liquefaction, Int. J. Hydrogen Energy 1978, vol. 3, 321-334.
(Continued)

*Primary Examiner* — Steven J Bos
*Assistant Examiner* — Syed T Iqbal
(74) *Attorney, Agent, or Firm* — Elwood L. Haynes

(57) ABSTRACT

A method of co-producing liquid hydrogen and ammonia, including a hydrogen generator, a nitrogen generator, and a HLU is presented. The method includes pressurizing a hydrogen stream from the hydrogen generator in a hydrogen compressor, dividing the pressurized hydrogen into at least a first portion and a second portion, wherein the first portion includes at least part of the flow of a first refrigeration cycle in the HLU, and the second part comprises at least part of the feed to an ammonia plant. The method also includes pressurizing a nitrogen stream from the nitrogen generator in a HP nitrogen compressor, dividing the pressurized nitrogen stream into at least a first part and a second part, wherein the first part comprises at least part of the flow of a second refrigeration cycle in the HLU, and the second part comprises at least part of the feed to the ammonia plant.

20 Claims, 5 Drawing Sheets

(52) U.S. Cl.
CPC ............... *C01B 2203/0233* (2013.01); *C01B 2203/068* (2013.01); *C01B 2203/1623* (2013.01); *C01B 2203/1633* (2013.01); *F25J 2215/10* (2013.01); *F25J 2230/30* (2013.01); *F25J 2240/04* (2013.01)

(58) Field of Classification Search
CPC .... C01B 2203/1633; C01B 2203/0244; C01B 2203/025; C01B 2203/04; C01B 3/34; C01C 1/0423; C01C 1/04; F25J 1/0015; F25J 1/0035; F25J 2215/10; F25J 2230/30; F25J 2240/04; F25J 2200/72; F25J 2210/06; F25J 2210/42; F25J 2215/50; F25J 1/004; F25J 1/0045; F25J 1/0221; F25J 1/0236; F25J 1/0288; F25J 3/04284; F25J 3/044; F25J 3/04612; F25J 2260/44; F25J 2270/06; F25J 2270/16; F25J 2270/90; F25J 1/0037; F25J 1/005; F25J 1/0072; F25J 1/0208; F25J 1/0228; F25J 1/0234; F25J 3/04224; F25J 3/04357; F25J 3/04393; F25J 3/04496; F25J 3/04533; F25J 3/04539; F25J 3/04563; F25J 3/04587; F25J 1/001
See application file for complete search history.

(56) References Cited

U.S. PATENT DOCUMENTS

| | | | |
|---|---|---|---|
| 6,248,794 B1 | 6/2001 | Gieskes | |
| 6,393,867 B1 * | 5/2002 | Guillard | ............... F25J 3/04412 62/643 |
| 6,981,994 B2 | 1/2006 | Drnevich et al. | |
| 2003/0110694 A1 | 6/2003 | Drnevich et al. | |
| 2018/0038638 A1 | 2/2018 | Guillard et al. | |

OTHER PUBLICATIONS

International Search Report and Written Opinion for corresponding PCT/US202/028442, dated Jul. 20, 2021.

* cited by examiner

NITROGEN PROCESS FOR PRODUCTION OF AMMONIA AND LIQUID HYDROGEN

CROSS REFERENCE TO RELATED APPLICATIONS

This application claims the benefit of priority under 35 U.S.C. § 119 (a) and (b) to U.S. Provisional Patent Application No. 63/013,763, filed Apr. 22, 2020, the entire contents of which are incorporated herein by reference.

BACKGROUND

Hydrogen liquefaction and ammonia production units are both high capital cost processes due to the large amount of production and compression equipment required. For a typical ammonia production unit, compression equipment includes hydrogen compression typically from 20-30 bara (for example from the outlet of a Pressure Swing Adsorption unit (PSA)) to greater than 90 bara for processing with nitrogen in the ammonia production reactor. The nitrogen gas may be from an air separation (ASU) unit or pipeline.

For a typical hydrogen liquefier unit, hydrogen compression is typically used to provide feed gas compression and refrigeration energy. This is typically in the form of small low-pressure level compression (typically from 1.1 bara inlet to 5-10 bara outlet), as well as a large high-pressure level compression (typically from 5-10 bara to 50-70 bara). The intermediate pressure level (e.g. typically 5-10 bar) is chosen by process cycle optimization of the refrigeration heat transfer as a trade-off between flow rate and pressure ratio for optimal high-pressure compressor and turbine designs. Many compression and expansion stages are required as hydrogen is difficult to compress and expand due to its very low molecular weight.

Currently, ammonia and hydrogen liquefaction production units (HLU) are typically independent process systems It is well established that industrial sites often have synergies available making it a desirable location for multiple process units. These synergies are typically the availability of power, cooling water, instrument air, permitting or even a shared source of hydrogen. However, further detailed process synergies are typically not foreseen or feasible due to integration limitations to one or both processes.

Turning to FIG. 1, a typical ammonia synthesis process, as is known to the art, is presented. Fundamentally, ammonia synthesis requires a hydrogen inlet stream 101 and a high-pressure nitrogen stream 102. Typically, these reactant gas streams are blended in essentially a stoichiometric ratio. The compressed blended reactant gas 103 is then introduced into one or more catalyst beds contained within an ammonia reactor 104, thus producing product ammonia stream 105.

Hydrogen inlet stream 101 may be provided by any source, such as a reaction off-gas 106 or produced in a hydrogen generator 107. Such a hydrogen generation system 107 may include, for example, a Steam Methane Reformer (SMR), a methane cracker, an Autothermal Reformer (ATR), or a Partial Oxidation Reformer (POX), or other processes known to the art. Hydrogen generation system 107 produces a synthesis gas stream 108 containing hydrogen and carbon monoxide, usually along with some carbon dioxide and residual hydrocarbons. A hydrogen separation device 109 is then used to produce hydrogen inlet stream 101 from syngas stream 108. Hydrogen separation device 109 may be a PSA, and/or a membrane separation unit, or other processes known to the art.

The high-pressure gaseous nitrogen stream 102 may be provided by any source, such as a reaction off-gas 110 or produced in a nitrogen generation unit 111. Nitrogen generation unit 111 is typically an ASU. There are commonly recognized synergies realized by using an ASU in combination with a hydrogen generation system that requires an oxygen stream, such as a POX or ATR. One such synergy would be when the gaseous nitrogen stream, co-produced simultaneously in the ASU, is compressed, cooled, and then sent to ammonia synthesis.

When hydrogen generation unit 107 is an SMR, oxygen is not used, and thus an ASU is not required. It is known to the art that oxygen can be utilized for debottlenecking an SMR by injecting into the process stream or by enriching the air to the burner. However, the prior art does not teach the method of enrichment or reducing capital equipment cost.

Regarding the ammonia process, thermodynamically, the reaction of hydrogen inlet stream 101 and high-pressure gaseous nitrogen stream 102 to ammonia stream 105 requires the reaction preferentially be performed at elevated temperature and pressure. These conditions are usually above 100 bara and at temperatures around 600° C. A hydrogen generation system 107 such as a POX typically operates at a significantly lower pressure, commonly around 30 bara. Likewise, while there are ASU designs that produce high pressure nitrogen streams, typically the gaseous nitrogen is produced at pressures of approximately 40 bara. This demand for higher pressure reactants within ammonia generator 104, therefore requires, within the prior art, either a hydrogen compressor 112 and hydrogen aftercooler 113; a nitrogen compressor 114 and nitrogen aftercooler 114; and/or a combined hydrogen and nitrogen compressor 116 and combined after cooler 117. So, either individually, or as a combined stream, this reactant stream will need to be compressed prior to entering ammonia reactor.

Turning to FIG. 2, a typical hydrogen liquefaction plant 200 as is known in the art is presented. In a typical hydrogen liquefaction plant, a hydrogen inlet stream 201 is sent to a hydrogen liquefaction cold box 202 where it is initially cooled to approximately −190° C. Often, hydrogen inlet stream 201 is at a medium pressure, typically at 20-30 bara. Hydrogen inlet stream 201 may be provided from a hydrogen generator 203 or as a reaction off-gas stream 204. Hydrogen generator 203 may be an SMR, POX, ATR, PSA, or other systems known to the art. Reaction off-gas stream 204 may be a byproduct of a Chlor-alkali unit (requiring additional compression), reaction off gas, or pipeline, or other available sources.

Hydrogen generator 203 is commonly followed by a hydrogen separation device 205 such as a PSA, dryer, etc. and further purified in cold adsorbers (not shown) at approximately −190 C.

At least a portion of the refrigeration required by the hydrogen liquefaction plant is typically provided by nitrogen refrigeration 206. Nitrogen refrigeration 206 may include a single turbine, multiple turbines (not shown), and/or turbines with boosters (not shown) in addition to mechanical refrigeration unit utilizing ammonia, or other refrigerant (not shown), vaporization and warming of Liquid nitrogen (not shown). Nitrogen, or another refrigerant, may be supplied either externally or from nearby ASU (not shown). Additionally, the nitrogen refrigeration may employ a multistage nitrogen recycle compressor to complete the closed loop.

The gaseous hydrogen 201 cooled by the nitrogen refrigeration cycle is then typically further cooled and liquefied within the hydrogen liquefaction cold box 202 at approximately −252° C. by a secondary refrigeration cycle 207.

Refrigeration for this level of cooling may be provided by an open hydrogen refrigeration cycle, or a closed hydrogen refrigeration cycle with a Joule-Thompson expander, or dense fluid mechanical turbine, single or multiple turbines, a flash gas compressor, and a hydrogen recycle compressor. The product liquefied hydrogen stream exits the hydrogen liquefaction cold box.

Compressed hydrogen recycle stream 208 enters the hydrogen liquefaction cold box 202. A first portion 209 of compressed hydrogen recycle steam 208 exits hydrogen liquefaction cold box 202 and is expanded in one or more expansion turbines 210. Cold, expanded first portion hydrogen stream 211 then reenters hydrogen liquefaction cold box 202 and indirectly exchanges heat with high purity hydrogen stream 201 and compressed hydrogen recycle stream 208. As the warmed hydrogen recycle gas stream 213 exits the hydrogen liquefaction cold box 202, it is combined with compressed and cooled flash gas 214, compressed in hydrogen recycle compressor 215, cooled in recycle cooler 216 and returned to hydrogen liquefaction cold box 202 as compressed hydrogen recycle stream 208.

A second portion 212 of compressed hydrogen recycle stream 208 continues through hydrogen liquefaction cold box 202, after exiting is passed through Joule-Thompson expander 217 or mechanical turbine (not shown), thus producing a cold, expanded second portion hydrogen stream 218. Cold, expanded second portion hydrogen stream 218, or flash stream, is then reintroduced into hydrogen liquefaction cold box 202 to indirectly exchange heat with high purity hydrogen stream 201. As the warmed flash gas stream 219 exits the hydrogen liquefaction cold box 202, it is then compressed in a flash gas compressor 220, cooled in flash gas cooler 221, and combined with the expanded and warmed hydrogen stream 213. Secondary refrigeration cycle 207 typically has a high-side pressure of around 60 bara.

As used herein the term HPN (High Pressure Nitrogen Generator) is defined as a simple distillation column provided with a head condenser. In such a column, the air to be treated, compressed under a pressure of the order of 6 to 12 bars, from which water and carbon dioxide have been removed and cooled to the vicinity of its dew point, is introduced at the base of the column. The "rich liquid" (oxygen enriched air) collected in the vat portion of the column is expanded and vaporized in the head condenser, after which it is removed as a residue. The gaseous nitrogen produced is withdrawn from the head portion of the column.

Turning to FIG. 3, a typical HPN plant as is known in the art is presented. The installation is designed to produce gaseous nitrogen under pressure on the order of 8 to 10 bars absolute. It comprises essentially a feed air compressor 301, an adsorber 302, a heat exchange line 303, a rectification column 304 equipped with a head condenser 305 and a liquid nitrogen holding tank 306. A first conduit 307 equipped with an expansion valve 308 connects the sump of the column to the condenser 305.

During nominal operation, inlet air 320 is compressed at 1 to about 8 bars absolute in feed air compressor 301. The compressed stream is purified of water and carbon dioxide in adsorber 302 and cooled in heat exchange line 303, then introduced via cold inlet air 309 into the sump of rectification column 304, where it is separated to form nitrogen to the desired concentration, one part of which is withdrawn from the head of the column via liquid nitrogen stream 310 to be reheated in heat exchange line 303 and exits the system a product nitrogen stream 311. The nitrogen not drawn off is condensed in the condenser 305 to provide the reflux of the column. Cooling of this condenser is obtained by sending thereto rich liquid removed from column 304 via rich liquid stream 312 and expanded in the expansion valve 313. During this nominal operation, a slight flow of liquid nitrogen 314 maybe continuously sent to tank 306 If needed to satisfy increased nitrogen demand, supplemental flow 319 may be introduced into rectification column 304.

An oxygen enriched stream 315 is removed from rectification column 304 and heated in heat exchange line 303. Typically, this warmed stream is expanded in turboexpander 316 and reintroduced into heat exchange line 303 to exchange additional refrigeration with inlet air 320. Reheated oxygen enriched stream 317 may be used to regenerate adsorbers 302 and/or be exported as an oxygen rich stream 318.

SUMMARY

A method of co-producing liquid hydrogen and ammonia, including a hydrogen generator, a nitrogen generator, and a HLU is presented. The method includes pressurizing a hydrogen stream from the hydrogen generator in a hydrogen compressor, dividing the pressurized hydrogen into at least a first portion and a second portion, wherein the first portion includes at least part of the flow of a first refrigeration cycle in the HLU, and the second part comprises at least part of the feed to an ammonia plant. The method also includes pressurizing a nitrogen stream from the nitrogen generator in a HP nitrogen compressor, dividing the pressurized nitrogen stream into at least a first part and a second part, wherein the first part comprises at least part of the flow of a second refrigeration cycle in the HLU, and the second part comprises at least part of the feed to the ammonia plant

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

Figure 1:
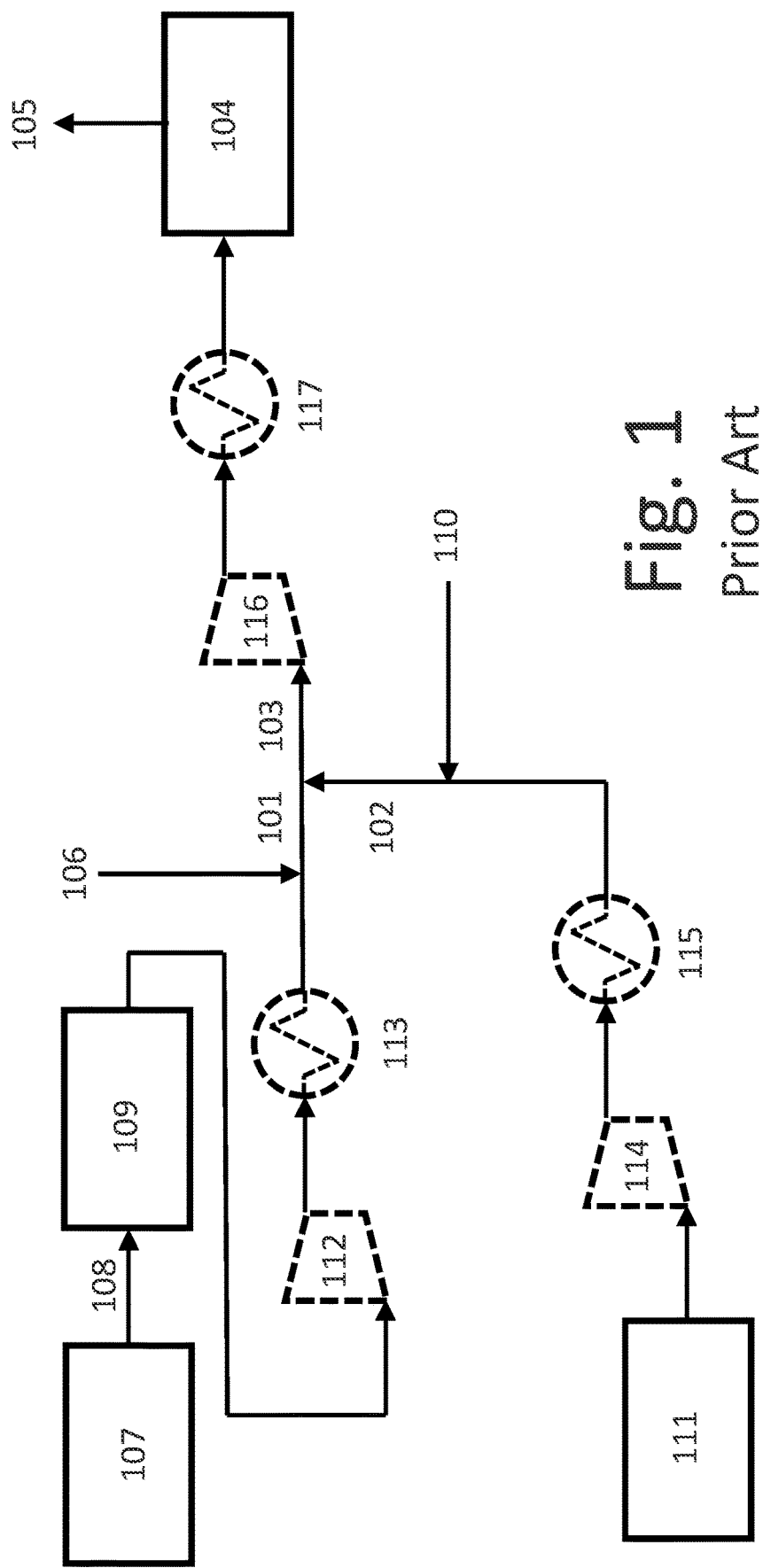
FIG. 1 is a schematic representation of a typical ammonia synthesis process, as is known to the art.
Figure 2:
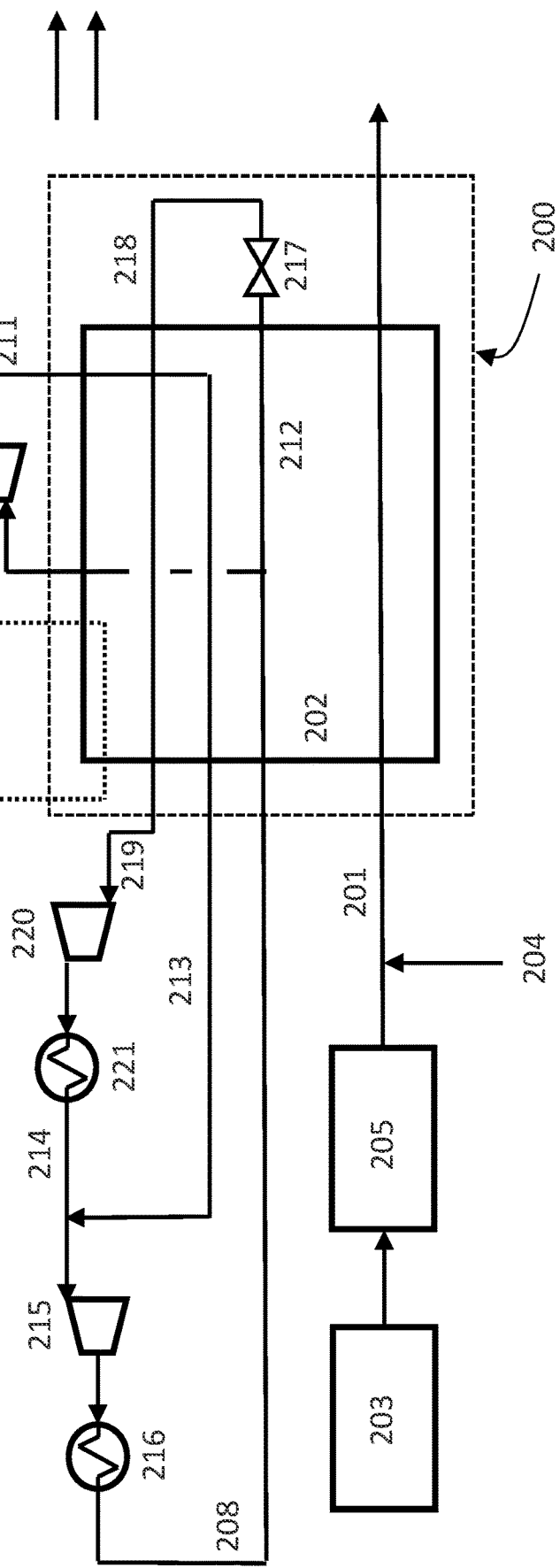
FIG. 2 is a schematic representation of a typical hydrogen liquefaction plant s is known in the art.

101=hydrogen inlet stream
102=high-pressure nitrogen stream
103=compressed, blended reactant gas
104=ammonia reactor
105=product ammonia stream
106=hydrogen (reaction) off-gas
107=hydrogen generator
108=synthesis gas stream
109=hydrogen separation device
110=nitrogen (reaction) off-gas
111=nitrogen generation unit
112=hydrogen compressor 113=hydrogen aftercooler
114=nitrogen compressor
115=nitrogen aftercooler
116=combined hydrogen and nitrogen compressor
117=combined hydrogen and nitrogen aftercooler
201=hydrogen inlet stream
202=hydrogen liquefaction cold box
203=hydrogen generator
204=hydrogen (reaction) off-gas
205=hydrogen separation device
206=nitrogen refrigeration system
207=secondary refrigeration system
208=compressed hydrogen recycle stream
209=first portion (of compressed hydrogen recycle stream 208)
210=(one or more) expansion turbine
211=cold, expanded first portion (of compressed hydrogen recycle stream 208)
212=second portion (of compressed hydrogen recycle stream 208)
213=warmed hydrogen recycle gas stream
214=compressed and cooled flash gas stream
215=hydrogen recycle compressor
216=recycle cooler
217=Joule-Thompson expander
218=cold, expanded second portion (of compressed hydrogen recycle stream 208)
219=warmed flash gas stream
220=flash gas compressor
221=flash gas cooler
301=feed air compressor
302=adsorber
303=heat exchange line
304=rectification column
305=head condenser
306=liquid nitrogen holding tank
307=first conduit
308=expansion valve
309=cold inlet air stream
310=liquid nitrogen stream
311=product nitrogen stream
312=rich liquid stream
313=expansion valve
314=liquid nitrogen stream
315=oxygen enriched stream
316=turboexpander
317=reheated oxygen enriched stream
318=oxygen rich stream
319=supplemental nitrogen stream
320=inlet air
401=hydrogen inlet stream
402=hydrogen generator
403=hydrogen separation device
404=first portion (of hydrogen inlet stream)
405=second portion (of hydrogen inlet stream)
406=compressed and cooled flash gas stream
407=warmed hydrogen recycle gas stream
408=hydrogen recycle stream
409=hydrogen recycle compressor
410=hydrogen recycle cooler
411=cooled, hydrogen recycle stream
412=first portion (of cooled, hydrogen recycle stream)
413=second portion (of cooled, hydrogen recycle stream)
414=second portion (of compressed combined nitrogen stream)
415=ammonia synthesis gas stream
416=ammonia synthesis gas compressor
417=ammonia synthesis reactor
418=inlet air stream
419=inlet air compressor
420=inlet air cooler
421=HPN
422=oxygen rich stream
422A=oxygen rich stream to hydrogen generator process feed stream
422B=oxygen rich stream to hydrogen generator fuel feed stream
423=product nitrogen steam
424=compressed, first warm nitrogen refrigeration stream
425=second warm nitrogen refrigeration stream
426=combined nitrogen stream
427=mixed use nitrogen compressor
428=compressed combined nitrogen stream
429=first portion (of compressed combined nitrogen stream)
430=hydrogen generator process feed stream
431=hydrogen generator fuel feed stream
500=hydrogen liquefaction unit (HLU)
501=hydrogen liquefaction cold box
502=first nitrogen refrigeration turbine
503=second nitrogen refrigeration turbine
504=first nitrogen turboexpander
505=second nitrogen turboexpander
506=first portion (of first portion of cooled hydrogen recycle stream)
507=first hydrogen expansion turbine
508=second portion (of first portion of cooled hydrogen recycle stream)
509=second hydrogen expansion turbine
510=cold expanded first portion (of first portion of cooled hydrogen recycle stream)
511=cold expanded second portion (of first portion of cooled hydrogen recycle stream)
512=second portion (of first portion of cooled hydrogen recycle stream)
513=Joule-Thompson expander
514=cold, expanded second portion (of first portion of cooled hydrogen recycle stream)
515=low-pressure nitrogen stream
516=cold end flash separator
517=cooled gaseous hydrogen
518=liquefied hydrogen stream
519=phase separator
520=hydrogen vapor stream
521=liquefied product hydrogen

DESCRIPTION OF THE PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 4:
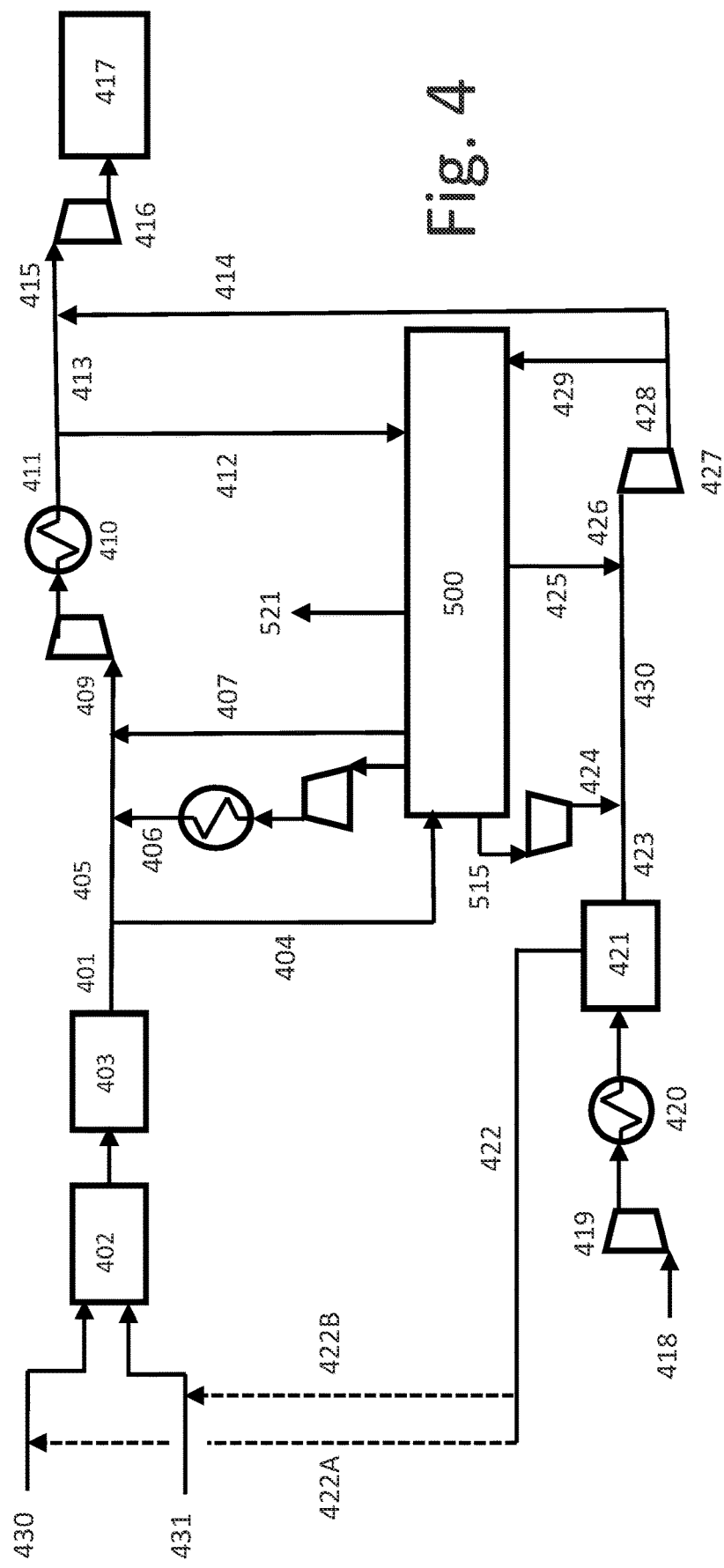
FIG. 4 is a schematic representation of a combined hydrogen liquefaction and ammonia production units, in accordance with one embodiment of the present invention.
Figure 5:
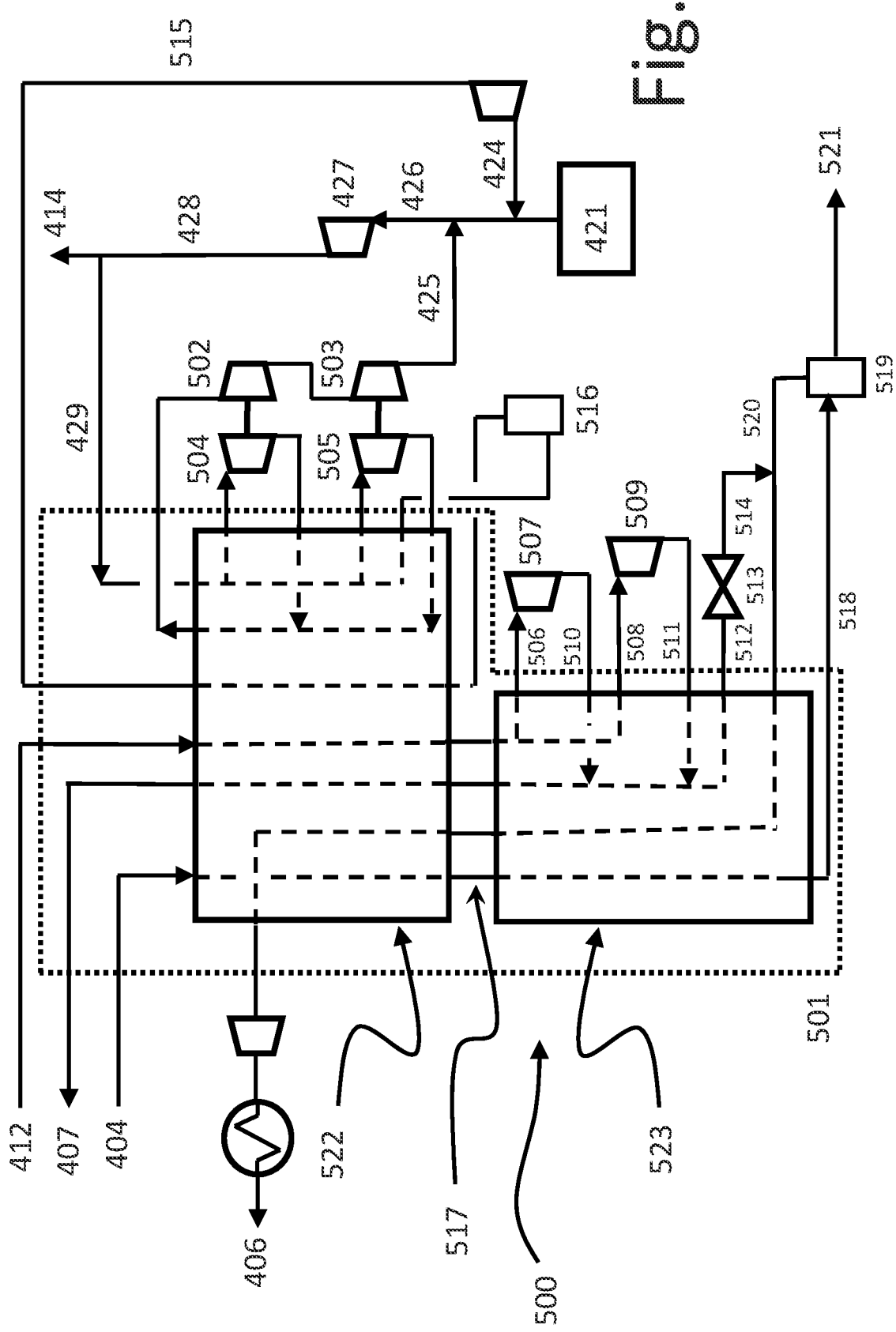
FIG. 5 is a schematic representation of the details of a hydrogen liquefaction, in accordance with one embodiment of the present invention.

Turning now to FIGS. 4 and 5, one embodiment of the present invention is presented. Hydrogen inlet stream 401 may be provided from a hydrogen generator 402 or as a reaction off-gas stream (not shown). Hydrogen generator 402 may be an SMR, POX, ATR, PSA, or other systems known to the art. In one preferred embodiment, hydrogen generator 402 is an SMR.

Hydrogen generator 402 is commonly followed by a hydrogen separation device 403 such as a PSA, dryer, etc. and further purified in cold adsorbers (not shown) at approximately −190 C. A first portion 404 of hydrogen inlet stream 401 (typically at 20-30 bara) is sent to hydrogen liquefaction cold box 501 where it is cooled to approximately −190° C. A second portion 405 of hydrogen inlet stream 401 is combined with the compressed and cooled flash gas stream 406 and warmed hydrogen recycle gas stream 407, thus forming hydrogen recycle stream 408.

Hydrogen recycle stream 408 is compressed in hydrogen recycle stream compressor 409 and cooled in hydrogen recycle stream cooler 410, thus producing cooled, hydrogen recycle stream 411. A first portion 412 of cooled, hydrogen recycle stream 411 enters hydrogen liquefaction cold box 501. A second portion 413 is combined with nitrogen stream 414, thus forming ammonia synthesis gas stream 415. Ammonia synthesis gas stream 415 is compressed in ammonia synthesis gas compressor 416 and sent to a downstream ammonia synthesis reactor 417.

Inlet air stream 418 may be compressed in inlet air compressor 419 and then cooled in inlet air cooler 420, before being introduced into HPN 421. Oxygen rich stream 422 is produced in HPN 421 and may be sent to hydrogen generator 402. At least a portion 422A of oxygen rich stream 422 may be sent to be combined with hydrogen generator process feed stream 430. Hydrogen generator process feed stream 430 will consist of at least one hydrocarbon containing stream (typically methane) and an oxygen containing stream (typically air). At least a portion 422B of oxygen rich stream 422 may be sent to be combined with hydrogen generator fuel feed stream 431. Hydrogen generator fuel feed stream 430 will consist of at least one hydrocarbon containing stream (typically methane) and an oxygen containing stream (typically air).

Product nitrogen stream 423, also produced in HPN 421, is combined with compressed first warm nitrogen refrigeration stream 424 and second warm nitrogen refrigeration stream 425, to form combined nitrogen stream 426. Combined nitrogen stream 426 is compressed in mixed use nitrogen compressor 427, thus forming compressed combined nitrogen stream 428. A first portion 429 of compressed combined nitrogen stream 428 is introduced into hydrogen liquefaction cold box 502. A second portion 414 of compressed combined nitrogen stream 428 is combined with second portion 413 as described above.

A first portion 412 of cooled hydrogen recycle stream 411 enters hydrogen liquefaction cold box 501. A second fraction of cooled hydrogen recycle stream 411 exits hydrogen liquefaction cold box 501 and may be mixed with the $2^{nd}$ high-pressure nitrogen stream from the mixed use (refrigeration cycle+ammonia feed) nitrogen compressor 427 before sent to ammonia synthesis reactor 417.

A first portion 506/508 of first portion of cooled hydrogen recycle steam 412 exits hydrogen liquefaction cold box 501 and is expanded in one or more expansion turbines 507/509. Cold, expanded first portion hydrogen stream 510/511 then reenters hydrogen liquefaction cold box 501 and indirectly exchanges heat with second portion 405. As warmed hydrogen recycle gas stream 407 exits hydrogen liquefaction cold box 501, it is combined with compressed and cooled flash gas stream 406 and second portion 504 of hydrogen inlet stream 401. This combined hydrogen recycle stream 408 is then compressed in hydrogen recycle compressor 409 and cooled in hydrogen recycle cooler 410, thereby producing compressed hydrogen recycle stream 411.

One preferred embodiment for the arrangement of the hydrogen expanders is all expanders in parallel (rather than expanders in series as typical arrangement for hydrogen liquefier. The pressure ratio for the hydrogen expanders and the mixed use hydrogen cycle compressor/hydrogen Feed to ammonia unit compressor is established by the hydrogen pressure from PSA (approximately 25-30 bara) and the equipment constraint limits of high-pressure hydrogen and high-pressure nitrogen pressure (approximately 65 bara)

A second portion 512 of cooled hydrogen recycle steam 412 continues through hydrogen liquefaction cold box 501, after exiting it passed through Joule-Thompson expander 513 or mechanical dense fluid turbine (not shown), thus producing a cold, expanded second portion hydrogen stream 514. Cold, expanded second portion hydrogen stream 514, or flash gas stream, is then reintroduced into hydrogen liquefaction cold box to indirectly exchange heat with high purity hydrogen stream. As the warmed flash gas stream exits the hydrogen liquefaction cold box 501, it is then compressed in a flash gas compressor 430, cooled in flash gas cooler 431, thereby producing compressed and cooled flash gas stream 406. This secondary refrigeration cycle typically has a high-side pressure of around 65 bara.

A portion of the refrigeration required by the system is provided by a nitrogen refrigeration subsystem 522. In in one representative embodiment, nitrogen refrigeration subsystem 522 may have two turbines 502/503 and are coupled with turboexpanders 504/505. However, nitrogen refrigeration subsystem 522 may also include a single turbine, multiple turbines, and/or turbines with boosters in addition to mechanical refrigeration unit utilizing ammonia, or other refrigerant (not shown), vaporization and warming of liquid nitrogen supplied either externally or from nearby ASU, or other refrigerant not shown). Additionally, the nitrogen refrigeration may employ a multistage nitrogen recycle compressor to complete the closed loop (no shown).

Figure 3:
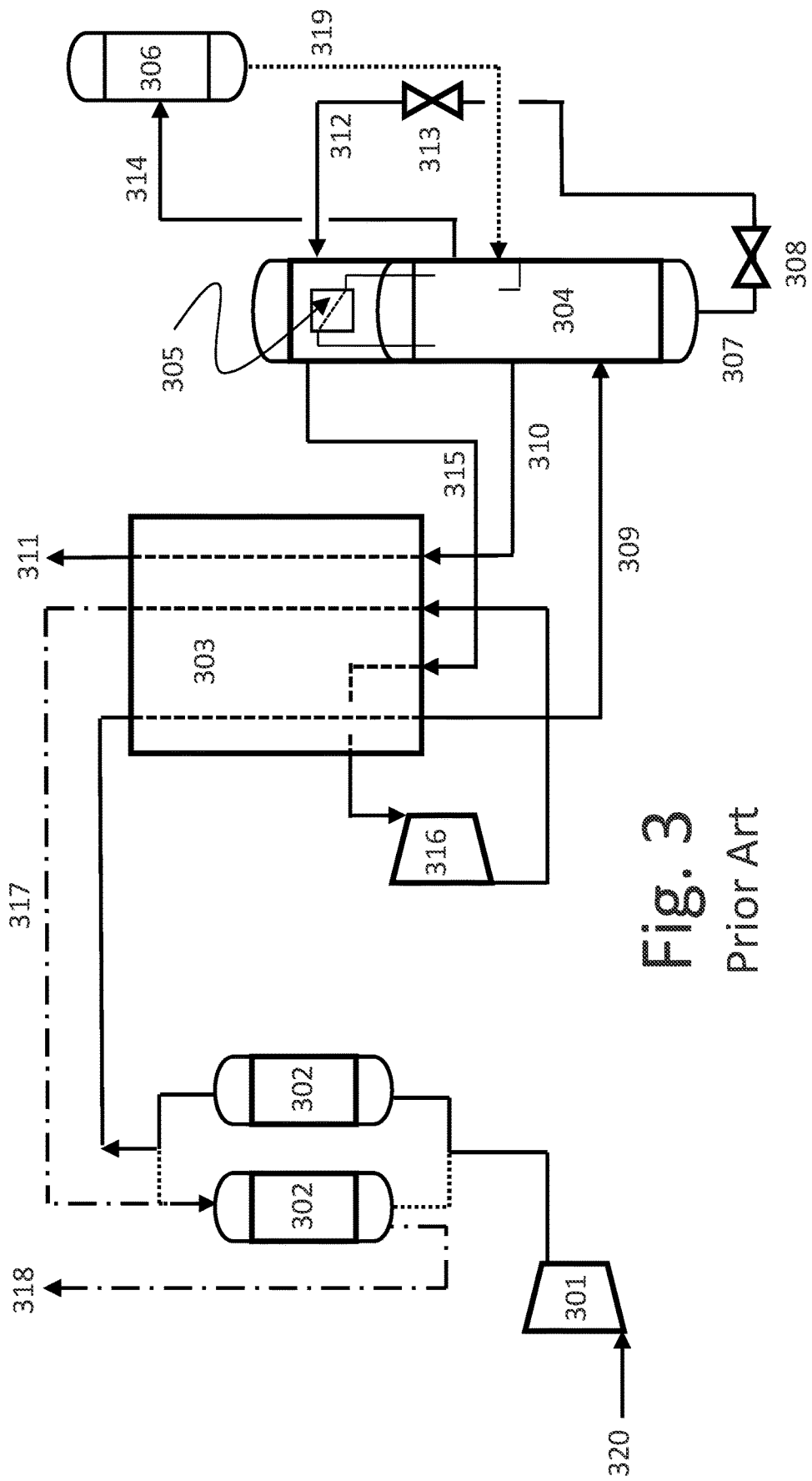
FIG. 3 is a schematic representation of a typical high-pressure nitrogen (HPN plant as is known in the art.

Turning again to FIG. 3, a typical efficient nitrogen generator produces gaseous nitrogen 311 at pressures of between 5 to 15 bara, or preferably between 8-10 bara, or more preferably 10 bara. This may be optimized at approximately 10 bara because this pressure is high enough to operate the oxygen/nitrogen distillation column 304 producing a pressurized product stream 311 and waste oxygen 318 is vaporized at pressures to produce the column reflux in main condenser 305 which allows pressure for expansion of the waste oxygen 318 for the process refrigeration balance.

This optimum HPN pressure of approximately 10 bara (or between 5-15 bara) is used to establish, or at least be similar to, the lower pressure at the outlet of the nitrogen refrigeration turbines 502/503 in the nitrogen process cycle of the HLU. The higher pressure of the nitrogen refrigeration cycle 522 is set to be similar to the high pressure of the hydrogen refrigeration cycle 523 of the HLU, which is potentially in the range of 65 bara. This allows the secondary stream of high-pressure hydrogen 407 and nitrogen to be removed from the cycle and mixed to form the feed hydrogen and nitrogen stream 415, which is compressed 416 and sent to the ammonia production unit 417. This high pressure approximately 65 bara is set by optimization of the pressure ratio and number of stages hydrogen compressor 409 and nitrogen compressor 427, limits on brazed aluminum heat exchanger (BAHX), and hydrogen expander 507/508 as well as ammonia synthesis gas stream gas compressor 416 design.

With the high and low pressures of the nitrogen refrigeration cycle compressor for the HLU set as described above (approximately 65 bara and approximately 10 bara respectively), a nitrogen expansion process is developed. In order to optimize the system, important design considerations include, but are not limited to, 1) the requirements and/or limitations of the BAHX, 2) limiting nitrogen expander pressures to less than 70 bara, 3) preferred nitrogen expander pressure ratios in the optimum range of approximately 11, and 4) speed matching requirements of the nitrogen expander and linked booster.

A dual turbine-booster process 502/503/504/505 is used with both turboexpander 504/505 having similar pressures, but different temperatures, in order to optimally cover the 300K to 80K temperature range to cool hydrogen. The approximately 65 bara nitrogen is partially cooled then sent to each turboexpander 504/505 before expanding to approximately 6 bara. The expanded, approximately 6 bara, stream is rewarmed, thus providing the refrigeration for the cycle. Then the warmed stream is boosted to approximately 10 bara in boosters 502/503 that are mechanically linked to the turboexpanders 504/505 (the boosters may be either in series or parallel to each other for speed matching with the turbine). The boosted, approximately 10 bara, nitrogen stream 425 then mixes with similar pressure nitrogen stream 430 from the HPN and optionally compressed low-pressure nitrogen stream 515 from the cold end flash separator 516, thus forming ammonia synthesis gas stream 415 which is sent to ammonia synthesis gas compressor 416. A $1^{st}$ high-pressure nitrogen stream 429 is sent to the HLU to complete the nitrogen refrigeration loop 522 and a $2^{nd}$ high-pressure nitrogen stream 414 is mixed with high-pressure hydrogen stream 413, further compressed 416 and sent to ammonia production unit 417.

The nitrogen flow required by the HPN is equal to the nitrogen demand of the ammonia production unit 417 ($2^{nd}$ high-pressure nitrogen stream 414) plus any nitrogen molecules lost in the system (i.e. seal losses).

The cooled gaseous hydrogen 517 cooled by the nitrogen refrigeration cycle 522 is then further cooled and liquefied 518 within the hydrogen liquefaction cold box at approximately −252° C. by a secondary refrigeration cycle. Refrigeration for this level of cooling may be provided by a hydrogen refrigeration cycle 523 with a Joule-Thompson expander 513, or dense fluid mechanical turbine, single or multiple turbines, a flash gas compressor, and a hydrogen recycle compressor (not shown). Liquefied hydrogen stream 518 may then enter phase separator 519, thus producing hydrogen vapor stream 520 (which combines with cold, expanded second portion 514) and liquefied hydrogen stream 521. Product liquefied hydrogen stream 521 exits the hydrogen liquefaction cold box 501.

It has been recognized in the art that oxygen can be produced and sent to an SMR for the purpose of debottlenecking the SMR. This high purity oxygen injection (normally greater than 96% oxygen and preferably greater than 99.5% oxygen) is either:

a) (preferred) directly into the process streams such that partial oxidation occurs in the reaction zone where the exothermic reaction provides additional heat to drive the reforming process, or b) mixed with air in the burner such that more fuel is used in the combustor and more heat generated and thus product produced.

The present invention utilizes oxygen rich waste gas stream 422 (from the HPN (~35% to 45% oxygen)) to enrich the air to the burners of the SMR, rather than purposely produced oxygen, since it is available at no additional operating expense as well as at the low pressure of the burner. In the present application there is both operating expense and capital expense savings for the waste gas injection to the burner. Regarding operating expense, the result is an approximately 5% reduction in natural gas consumption for reduced operating expense as well as carbon emissions. Regarding capital expense, there is an additional approximately 25-30% reduction in SMR equipment size since the flue gas flow is significantly reduced for the same product yield.

The maximum air enrichment is limited to a level of about 25-26% oxygen in the combustion gas. Above that level the higher pressure drops, and hotter tube wall temperatures become limiting. In addition, the higher flame temperatures may lead to increase NOx emissions.

The quantity of available oxygen molecules from the waste gas of the HPN is a function of nitrogen demand of the ammonia unit and nitrogen recovery (efficiency) of the HPN. The capacity of the SMR is directly proportional to the combined hydrogen flows for the ammonia+HLU units. Therefore, the optimum 25% enrichment to SMR burners when all the waste oxygen is sent to the burner is achievable for ammonia/liquid hydrogen mass production ratio of ~9.0. (or in the range of 4.0 to 15.0). Otherwise the 25% enrichment is achievable without the HLU unit (i.e. SMR+HPN+ ammonia only) where a similar hydrogen flow is diverted to another user or if not all of the available waste oxygen is utilized.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of co-producing liquid hydrogen and ammonia, comprising a hydrogen generator, a nitrogen generator, and a hydrogen liquefaction unit, the method comprising:

pressurizing a hydrogen stream from the hydrogen generator in a high-pressure hydrogen compressor, dividing the pressurized hydrogen stream into at least a first portion and a second portion, wherein the first portion comprises at least part of the flow of a first refrigeration cycle in the hydrogen liquefaction unit, and the second part comprises at least part of the feed to an ammonia plant, and pressurizing a nitrogen stream from the nitrogen generator in a high-pressure nitrogen compressor, dividing the pressurized nitrogen stream into at least a first part and a second part, wherein the first part comprises at least part of the flow of a second refrigeration cycle in the hydrogen liquefaction unit, and the second part comprises at least part of the feed to the ammonia plant.

2. The method of claim 1, wherein the high-pressure nitrogen compressor has an inlet pressure and the inlet pressure is between 5 bara and 15 bara.

3. The method of claim 2, wherein the inlet pressure is between 8 bara and 12 bara.

4. The method of claim 1, wherein the high-pressure nitrogen compressor has an outlet pressure, and the outlet pressure is between 40 bara and 90 bara.

5. The method of claim 4, wherein the outlet pressure is between 60 bara and 70 bara.

6. The method of claim 1, wherein the hydrogen liquefaction unit comprises at least two expansion turbines in parallel.

7. The method of claim 1, wherein the hydrogen liquefaction unit comprises at least one nitrogen turbine.

8. The method of claim 7, wherein the hydrogen liquefaction unit comprise two or more nitrogen turbine in parallel.

9. The method of claim 7, wherein the hydrogen liquefaction unit comprise two or more nitrogen turbine in series.

10. The method of claim 1, wherein the hydrogen liquefaction unit comprises a low-pressure flash drum, thereby providing additional refrigeration.

11. The method of claim 1, wherein the hydrogen generator comprises a steam methane reformer, wherein the steam methane reformer comprises a process feed stream, wherein the nitrogen generator comprises a distillation column producing the nitrogen stream and an oxygen enriched stream, and wherein at least a portion of the oxygen enriched stream is combined with the process feed stream of the steam methane reformer.

12. The method of claim 1, wherein the hydrogen generator comprises a steam methane reformer, wherein the steam methane reformer comprises a fuel feed stream, wherein the nitrogen generator comprises a distillation column producing the nitrogen stream and an oxygen enriched stream, and wherein at least a portion of the oxygen enriched stream is combined with the fuel feed stream of the steam methane reformer.

13. The method of claim 11, wherein the oxygen enriched stream comprises between 21 mol % and 40 mol % oxygen.

14. The method of claim 11, wherein the oxygen enriched stream comprises between 23 mol % and 30 mol % oxygen.

15. The method of claim 12, wherein the oxygen enriched stream comprises between 21 mol % and 40 mol % oxygen.

16. The method of claim 12, wherein the oxygen enriched stream comprises between 23 mol % and 30 mol % oxygen.

17. The method of claim 1, further comprising an ammonia reactor, wherein the ammonia reactor produces a first volume flowrate, the hydrogen liquefaction unit produces a second volume flowrate, and the ratio of the first volume flowrate to the second volume flowrate is between 4.0 and 15.0.

18. The method of claim 17, wherein the ratio of the first volume flowrate to the second volume flowrate is between 6.0 and 12.0.

19. A method of co-producing liquid hydrogen and ammonia, comprising a hydrogen generator, a nitrogen generator, and a hydrogen liquefaction unit, the method comprising:

pressurizing a hydrogen stream from the hydrogen generator in a high-pressure hydrogen compressor, dividing the pressurized hydrogen stream into at least a first portion and a second portion, wherein the first portion comprises at least part of the flow of a first refrigeration cycle in the hydrogen liquefaction unit, and the second part comprises at least part of the feed to an ammonia plant, and pressurizing a nitrogen stream from the nitrogen generator in a high-pressure nitrogen compressor, dividing the pressurized nitrogen stream into at least a first part and a second part, wherein the first part comprises at least part of the flow of a second refrigeration cycle in the hydrogen liquefaction unit, and the second part comprises at least part of the feed to the ammonia plant, and an ammonia reactor, wherein the ammonia reactor produces a first volume flowrate, the hydrogen liquefaction unit produces a second volume flowrate, and the ratio of the first volume flowrate to the second volume flowrate is between 4.0 and 15.0, and wherein the hydrogen generator comprises a steam methane reformer, wherein the steam methane reformer comprises a process feed stream, wherein the nitrogen generator comprises a distillation column producing the nitrogen stream and an oxygen enriched stream, and wherein at least a portion of the oxygen enriched stream is combined with the process feed stream of the steam methane reformer.

20. A method of co-producing liquid hydrogen and ammonia, comprising a hydrogen generator, a nitrogen generator, and a hydrogen liquefaction unit, the method comprising:

pressurizing a hydrogen stream from the hydrogen generator in a high-pressure hydrogen compressor, dividing the pressurized hydrogen stream into at least a first portion and a second portion, wherein the first portion comprises at least part of the flow of a first refrigeration cycle in the hydrogen liquefaction unit, and the second part comprises at least part of the feed to an ammonia plant, and pressurizing a nitrogen stream from the nitrogen generator in a high-pressure nitrogen compressor, dividing the pressurized nitrogen stream into at least a first part and a second part, wherein the first part comprises at least part of the flow of a second refrigeration cycle in the hydrogen liquefaction unit, and the second part comprises at least part of the feed to the ammonia plant, and an ammonia reactor, wherein the ammonia reactor produces a first volume flowrate, the hydrogen liquefaction unit produces a second volume flowrate, and the ratio of the first volume flowrate to the second volume flowrate is between 4.0 and 15.0, and wherein the hydrogen generator comprises a steam methane reformer, wherein the steam methane reformer comprises a fuel feed stream, wherein the nitrogen generator comprises a distillation column producing the nitrogen stream and an oxygen enriched stream, and wherein at least a portion of the oxygen enriched stream is combined with the fuel feed stream of the steam methane reformer.

* * * * *